United States Patent
Srinivasan et al.

(10) Patent No.: US 12,019,436 B2
(45) Date of Patent: Jun. 25, 2024

(54) SYSTEM AND METHOD FOR PROACTIVE HANDLING OF MULTIPLE FAULTS AND FAILURE MODES IN AN ELECTRICAL NETWORK OF ENERGY ASSETS

(71) Applicant: Utopus Insights, Inc., Valhalla, NY (US)

(72) Inventors: Guruprasad Srinivasan, Bangalore (IN); Younghun Kim, Pleasantville, NY (US)

(73) Assignee: Utopus Insights, Inc., Valhalla, NY (US)

( * ) Notice: Subject to any disclaimer, the term of this patent is extended or adjusted under 35 U.S.C. 154(b) by 25 days.

(21) Appl. No.: 18/052,887

(22) Filed: Nov. 4, 2022

(65) Prior Publication Data

US 2023/0152794 A1 May 18, 2023

Related U.S. Application Data

(63) Continuation of application No. 16/234,450, filed on Dec. 27, 2018, now Pat. No. 11,493,911.

(51) Int. Cl.
*G05B 23/02* (2006.01)
*G05B 13/02* (2006.01)
(Continued)

(52) U.S. Cl.
CPC ......... *G05B 23/0283* (2013.01); *G05B 13/02* (2013.01); *G05B 23/0229* (2013.01);
(Continued)

(58) Field of Classification Search
CPC .......... G05B 23/0283; G05B 13/02; G05B 23/0229; G05B 23/0272; H02J 3/00;
(Continued)

(56) References Cited

U.S. PATENT DOCUMENTS 9,326,698 B2 5/2016 Blanco et al.
2011/0282508 A1 11/2011 Goutard et al.

OTHER PUBLICATIONS

Peng, Ying, Ming Dong, and Ming Jian Zuo. "Current status of machine prognostics in condition-based maintenance: a review." The International Journal of Advanced Manufacturing Technology 50 (2010): 297-313. (Year: 2010).*

(Continued)

*Primary Examiner* — Carlos R Ortiz Rodriguez
(74) *Attorney, Agent, or Firm* — Ahmann Kloke LLP

(57) ABSTRACT

An example method comprises receiving historical sensor data of a renewable energy asset for a first time period, identifying historical log data in one or more log sources, retrieving dates of the identified historical log data, retrieving sequences of historical sensor data using the dates, training hidden Markov models using the sequences of historical sensor data to identify probability of shifting states of one or more components of the renewable energy asset, receiving current sensor data of a second time period, identifying current log data in the one or more log sources, retrieving dates of the identified current log data, retrieving sequences of current sensor data using the dates, applying the hidden Markov models to the sequences of the current sensor data to assess likelihood of the one or more faults, creating a prediction of a future fault, and generating a report including the prediction of the future fault.

20 Claims, 13 Drawing Sheets

(51) Int. Cl.
*H02J 3/00* (2006.01)
*H02J 3/38* (2006.01)

(52) U.S. Cl.
CPC ............ *G05B 23/0272* (2013.01); *H02J 3/00* (2013.01); *H02J 3/001* (2020.01); *H02J 3/381* (2013.01); *H02J 2203/20* (2020.01); *H02J 2300/20* (2020.01)

(58) Field of Classification Search
CPC ........ H02J 3/001; H02J 3/381; H02J 2203/20; H02J 2300/20
See application file for complete search history.

(56) References Cited

OTHER PUBLICATIONS

Peng, Ying, and Ming Dong. "A prognosis method using age-dependent hidden semi-Markov model for equipment health prediction." Mechanical Systems and Signal Processing 25.1 (2011): 237-252. (Year: 2011).*

Gamse, Sonja, Fereydoun Nobakht-Ersi, and Mohammad A. Sharifi. "Statistical process control of a Kalman filter model." Sensors 14.10 (2014): 18053-18074. (Year: 2014).*

Jin, Chao. A sequential process monitoring approach using hidden Markov model for unobservable process drift. Diss. University of Cincinnati, 2015. (Year: 2015).*

Gerber, Timothée, Nadine Martin, and Corinne Mailhes. "Time-frequency tracking of spectral structures estimated by a data-driven method." IEEE Transactions on Industrial Electronics 62.10 (2015): 6616-6626. (Year: 2015).*

Sun, Peng, et al. "A generalized model for wind turbine anomaly identification based on SCADA data." Applied Energy 168 (2016): 550-567. (Year: 2016).*

Yang, Feng, et al. "Health index-based prognostics for remaining useful life predictions in electrical machines." IEEE Transactions on Industrial Electronics 63.4 (2016): 2633-2644. (Year: 2016).*

Park, Giseo, et al. "Integrated observer approach using in-vehicle sensors and GPS for vehicle state estimation." Mechatronics 50 (2018): 134-147. (Year: 2018).*

Xiao, Fei, and Qian Ai. "Data-driven multi-hidden markov model-based power quality disturbance prediction that incorporates weather conditions." IEEE Transactions on Power Systems 34.1 (2018): 402-412. (Year: 2018).*

International Application No. PCT/US2019/068843, International Search Report and Written Opinion dated Mar. 30, 2020.

* cited by examiner

SYSTEM AND METHOD FOR PROACTIVE HANDLING OF MULTIPLE FAULTS AND FAILURE MODES IN AN ELECTRICAL NETWORK OF ENERGY ASSETS

CROSS-REFERENCE TO RELATED APPLICATIONS

This application is a continuation of U.S. patent application Ser. No. 16/234,450, filed on Dec. 27, 2018 and entitled "System and Method for Proactive Handling of Multiple Faults and Failure Modes in an Electrical Network of Energy Assets," which is incorporated herein by reference in its entirety.

FIELD OF THE INVENTION

Embodiments of the present invention(s) relate generally to fault detection in electrical networks. In particular, the present invention(s) relate to fault detection in electrical networks and identifying the type of fault and potentially failure of component(s) of an energy asset of an electrical network.

DESCRIPTION OF RELATED ART

Detection and prediction of failure in one or more components of an asset of an electrical network has been difficult. Detection of a failure of a component of an asset is tedious and high in errors. In this example, an asset is a device for generating or distributing power in an electrical network. Examples of assets can include, but is not limited to, a wind turbine, solar panel power generator, converter, transformer, distributor, and/or the like. Given that detection of a failure of a component of an asset may be difficult to determine, increased accuracy of prediction of future failures compounds problems.

SUMMARY

An example non-transitory computer readable medium comprising executable instructions, the executable instructions being executable by one or more processors to perform a method, the method comprising receiving historical sensor data of a first time period, the historical data including sensor data from one or more sensors of a renewable energy asset, identifying historical log data in one or more log sources, the historical log data indicating one or more faults, the one or more log sources storing historical log data of the renewable energy asset, retrieving dates of the identified historical log data that indicates the one or more faults, retrieving sequences of historical sensor data using the dates of the identified historical log data, training hidden Markov models using the sequences of historical sensor data to identify probability of shifting states of one or more components of the renewable energy asset, receiving current sensor data of a second time period, the current sensor data including sensor data from at least a subset of the one or more sensors of the renewable energy asset, identifying current log data in the one or more log sources, the current log data indicating one or more faults, the one or more log sources storing current log data of the renewable energy asset, retrieving dates of the identified current log data that indicates the one or more faults, retrieving sequences of current sensor data using the dates of the identified current log data, applying the hidden Markov models to the sequences of the current sensor data to assess likelihood of the one or more faults and create a prediction of a future fault in the renewable energy asset, and generating a report including the prediction of the future fault in the renewable energy asset.

In various embodiments, the method further comprises extracting features from the sequences of the historical sensor data and training the hidden Markov models using the sequences of historical sensor data comprises training the hidden Markov models using the extracted features of the sequences of the historical sensor data. The method may further comprise extracting features from the sequences of the current sensor data and applying the hidden Markov models to the sequences of the current sensor data comprises applying the hidden Markov models to the extracted features of the sequences of the current sensor data. Extracting features may comprise dimension reduction of the sequences of the historical sensor data.

In various embodiments, identifying the historical log data in one or more log sources comprises searching two or more different log sources for different log data of a single component of the renewable energy asset. The two or more different log sources may include a first log source including error logs and a second log source including fault logs. creating the prediction of a future fault may comprise comparing maximum loglikelihood of different failure states from different components.

Creating the prediction of a future fault may comprise determining probability of different faults of two or more different components using an iterative Expectation-Maximization (EM) algorithm.

In some embodiments, the method further comprises comparing the prediction against a criteria to determine significance of one or more predicted faults and generating an alert based on the comparison, the alert including generating a message identifying the one or more predicted faults.

An example system comprises at least one processor and memory containing instructions, the instructions being executable by the at least one processor to: receive historical sensor data of a first time period, the historical data including sensor data from one or more sensors of a renewable energy asset, identify historical log data in one or more log sources, the historical log data indicating one or more faults, the one or more log sources storing historical log data of the renewable energy asset, retrieve dates of the identified historical log data that indicates the one or more faults, retrieve sequences of historical sensor data using the dates of the identified historical log data, train hidden Markov models using the sequences of historical sensor data to identify probability of shifting states of one or more components of the renewable energy asset, receive current sensor data of a second time period, the current sensor data including sensor data from at least a subset of the one or more sensors of the renewable energy asset, identify current log data in the one or more log sources, the current log data indicating one or more faults, the one or more log sources storing current log data of the renewable energy asset, retrieve dates of the identified current log data that indicates the one or more faults, retrieve sequences of current sensor data using the dates of the identified current log data; apply the hidden Markov models to the sequences of the current sensor data to assess likelihood of the one or more faults and create a prediction of a future fault in the renewable energy asset, and generate a report including the prediction of the future fault in the renewable energy asset.

An example method comprises receiving historical sensor data of a first time period, the historical data including sensor data from one or more sensors of a renewable energy asset, identifying historical log data in one or more log sources, the historical log data indicating one or more faults, the one or more log sources storing historical log data of the renewable energy asset, retrieving dates of the identified historical log data that indicates the one or more faults, retrieving sequences of historical sensor data using the dates of the identified historical log data, training hidden Markov models using the sequences of historical sensor data to identify probability of shifting states of one or more components of the renewable energy asset, receiving current sensor data of a second time period, the current sensor data including sensor data from at least a subset of the one or more sensors of the renewable energy asset, identifying current log data in the one or more log sources, the current log data indicating one or more faults, the one or more log sources storing current log data of the renewable energy asset, retrieving dates of the identified current log data that indicates the one or more faults, retrieving sequences of current sensor data using the dates of the identified current log data, applying the hidden Markov models to the sequences of the current sensor data to assess likelihood of the one or more faults and create a prediction of a future fault in the renewable energy asset, and generating a report including the prediction of the future fault in the renewable energy asset.

DETAILED DESCRIPTION

Asset management in a renewable industry mandates modeling of multiple faults and their respective failure modes. The complexity in prediction, however, is that in a multi-component system, there is dependency among the components of the system. Due to these dependencies, a fault in one component may lead to successive faults in depending components. As a result, it is important to consider a modeling framework that can model the effect of the fault propagation within the system by evaluating the status of its components for a given point of time. Such a framework may start with an effective design of the data scoping process that can capture the correlation that exists between the system and its components. In some embodiments, the systems architecture (framework) may be a representation of the system, organized in a way that supports reasoning about the structures and behaviors of the system.

Various embodiments described herein may include: (i) building an appropriate data scoping process that can aid a state-based machine learning model to model dependency that exists between a system and its components; and (ii) building an appropriate system architecture that supports the process of identifying the system failure with component level (part level) and failure mode level granularity.

Figure 1:
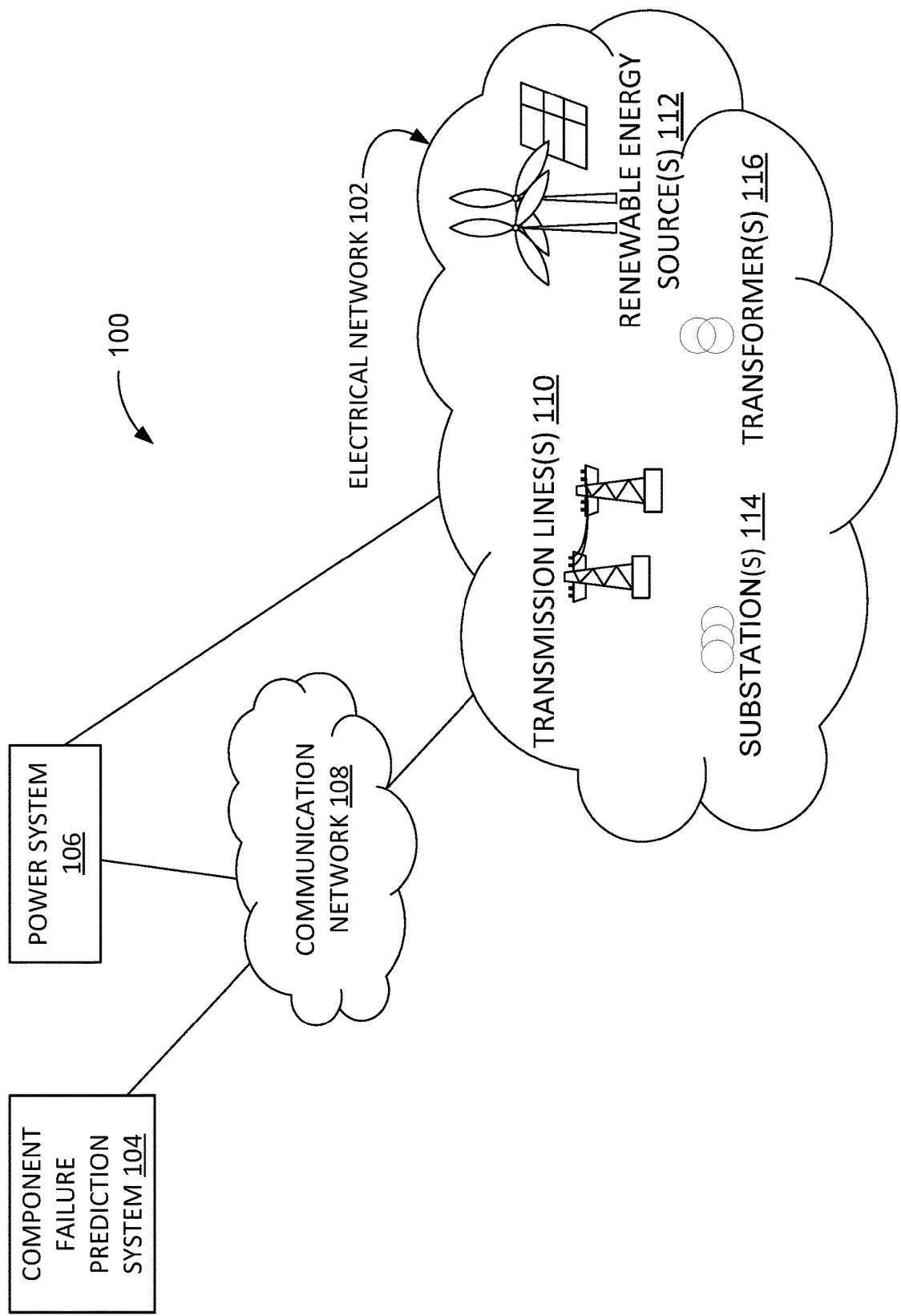
FIG. 1 depicts a block diagram of an example of an electrical network in some embodiments.

FIG. 1 depicts a block diagram 100 of an example of an electrical network 102 in some embodiments. FIG. 1 includes an electrical network 102, a component failure prediction system 104, a power system 106, in communication over a communication network 108. The electrical network 102 includes any number of transmission lines 110, renewable energy sources 112, substations 114, and transformers 116. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 110, the renewable energy source(s) 112, substation(s) 114, and/or transformer(s) 106 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each component of the electrical network 102 may represent one or more elements of their respective components. For example, the transformer(s) 116, as shown in FIG. 1 may represent any number of transformers which make up electrical network 102.

In some embodiments, the component failure prediction system 104 provides failure prediction based on models created from past data from regarding one or more components of the electrical network 102 (as described herein).

In some embodiments, communication network 108 represents one or more computer networks (e.g., LAN, WAN, and/or the like). Communication network 108 may provide communication between any of the component failure prediction system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The component failure prediction system 104 may include any number of digital devices configured to forecast component failure of any number of components and/or generators (e.g., wind turbine or solar power generator) of the renewable energy sources 112.

In various embodiments, the component failure prediction system 104 may reduce computational burden of forecasting failure of any number of components and/or generators by applying machine learning tools on historical data using information fusion as discussed herein.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 13.

Figure 2:
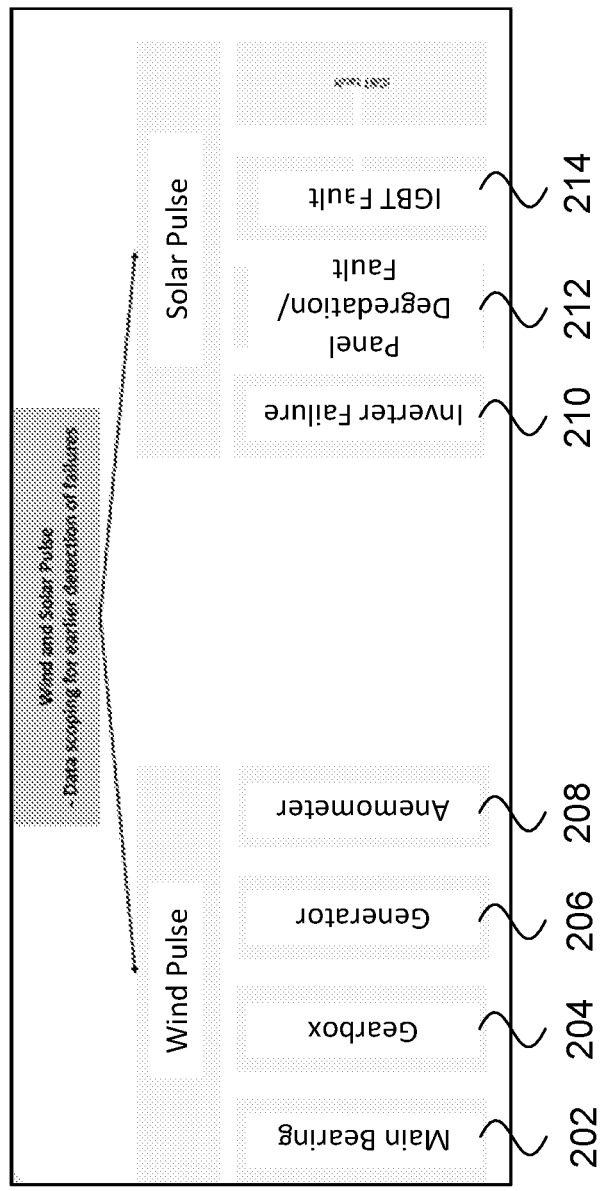
FIG. 2 depicts components that often produce failures of wind turbines and components that often produce failures in solar panel generators.

FIG. 2 depicts components that often produce failures of wind turbines and components that often produce failures in solar panel generators. Although FIG. 2 depicts failures in renewable energy assets such as wind turbines and solar panel generators, it will be appreciated that systems and methods described herein may apply to many different types of renewable energy assets, different types of non-renewable energy assets, and/or different systems where failure of a component may represent a hidden state as discussed herein. Returning to FIG. 2, failures in wind turbines often occur as a result of failures in a main bearing 202, gearbox 204, generator 206, or anemometer 208. Failures in solar panel generators often occur as a result of failures in an inverter 210, panel 212 degradation, and an IGBT 214.

A wind turbine has many potential components of failure. Different sensors may provide different readings for one or more different components or combinations of components. Given the number of wind turbines in a wind farm, the amount of data to be assessed may be untenable using prior art methods. For example, data analytics systems of the prior art do not scale, sensors provide too much data to be assessed by the prior art systems, and there is a lack of computational capacity in prior art systems to effectively assess data from wind farms in a time sensitive manner. As a result, prior art systems are reactive to existing failures rather than proactively providing reports or warnings of potential future failure of one or more components.

For example, various embodiments regarding a wind turbine described herein may identify potential failure of a main bearing 202, gearbox 204, generator 206, or anemometer 208 of one or more wind turbines. Although many bearings may be utilized in a wind turbine (e.g., yaw and pitch bearings), the main shaft and gearbox of the wind turbine tend to be the most problematic. For example, a main bearing 202 may fail due to high thrust load or may fail due to inadequate lubricant film generation. Trends in redesign of a main shaft 202 and/or gearbox 204 of a single wind turbine have been driven by unexpected failures in these units. The unplanned replacement of main-shaft bearing 202 can cost operators up to $450,000 and have an obvious impact on financial performance.

Gearbox 204 failures are one of the largest sources of unplanned maintenance costs. Gearbox 204 failures can be caused by design issues, manufacturing defects, deficiencies in the lubricant, excessive time at standstill, high loading, and other reasons. There may be many different modes of gearbox 204 failure and, as such, it may be important to identify the type of failure mode in addressing the failure. One mode is micropitting which occurs when lubricant film between contacting surfaces in a gearbox 204 is not thick enough. Macropitting occurs when contact stress in a gear or breaking exceeds the fatigue strength of the material. Bending fatigue a failure mode that affects gear teeth and axial cracking may occur in bearings of a gearbox; the cracks develop in the axial direction, perpendicular to the direction of rolling.

The generator 206 typically converts the wind energy to electrical energy. Failures often occur in bearings, stator, rotor, or the like which can lead to inconsistent voltage to total failure. Generator 206 failure may be difficult to detect as a result of inconsistent weather, lack of motion, and/or partial failure of the anemometer 208.

The anemometer 208 uses moving parts as sensors. Anemometers 208 often include "cups" for wind speed measurements and a wind vane that uses a "vane tail" for measuring vector change, or wind direction. Freezing weather has caused the "cups" and "vane tail" to lock. If an anemometer 208 under-reports wind speed because of a partial failure, there is an increase in rotor acceleration that indicates a large amount of wind energy is not converted into electrical engineering. Rolling resistance in an anemometer 208 bearings typically increase over time until they seize. Further, if the anemometer 208 is not accurate, the wind turbine will not control blade pitch and rotor speed as needed. Poor or inaccurate measurements by the anemometer 208 will lead to incorrect adjustments and increased fatigue.

Similarly, various embodiments regarding a solar panel generator described herein may identify potential failure of a inverter 210, solar panel 212, and IGBT 214 in one or more solar panels of a solar farm.

A solar inverter 210 is an electrical converter to convert variable direct current from a photovoltaic solar panel 212 into a utility frequency alternating current that can be fed to an electrical grid. Production loses are often attributable to poor performance of inverters 210. Solar inventers 210 may overheat (caused by weather, use, or failure of cooling systems) which can reduce production. Moisture may cause a short circuit which can cause complete or partial failure (e.g., to a minimum "required" isolation level). Further, failure of the solar inverter 210 to restart after gird fault may require manual restarting of the equipment.

The panel 212 refers to the solar or photovoltaic panel. The photovoltaic panel 212 may degrade due to weather, poor cleaning, thermal cycling, damp heat, humidity freezing, and UV exposure. Thermal cycling can cause solder bond failures and cracks. Damp heat has been associated with delamination of encapsulants and corrosion of cells. Humidity freezing can cause junction box adhesion to fail. UV exposure contributes to discoloration and backsheet degradation.

Solar inverters 210 often use insulated gate bipolar transistors (IGBT) 214 for conversion of solar panel 212 output to AC voltage. Failures in the IGBT 214 can be caused by fatigue, corrosion of metallizations, electromigration of metallizations, conductive filament formation, stress driven diffusion voiding, and time dependent dielectric breakdown.

It will be appreciated that there may be any number of wind turbines in a wind farm. Sensors of each wind turbine in a wind farm may generate its own data. As a result, there is a dump of timeseries data which is overwhelming for prior art systems and prior art methods of assessment. Monitoring hundreds of assets with hundreds of sensor inputs is time-consuming and overwhelming for operators to test. Existing prior art systems receive too much timeseries data to be effectively assessed in a scalable and/or computationally efficient manner. As a result, there is a conservative and or reactive response to component and wind turbine failure. In other words, action is typically taken well after failure is detected or when failure is both immanent and unmistakable.

For example, main shaft bearing failure may be caused by any number of components. For prior art analysis, challenges include identifying the correct mechanical systems model and nominal operating modes of that mechanical system model.

Prior art approaches may also fail due to incorrect sensor data mapping. Mapping of sensor data may be based on observability and take into account sensor dynamic range. In this example of the main shaft bearing failure, sensor data regarding temperature, noise, and/or vibration may be taken into account. For example, the sensor data related to temperature, noise, and/or vibration is observed against the background of other sensor data readings.

Further early indication of failures in temperature, noise, vibration, or other failures, can be easily overlooked if an nominal operating mode is loosely defined by the prior art system.

Figure 3:
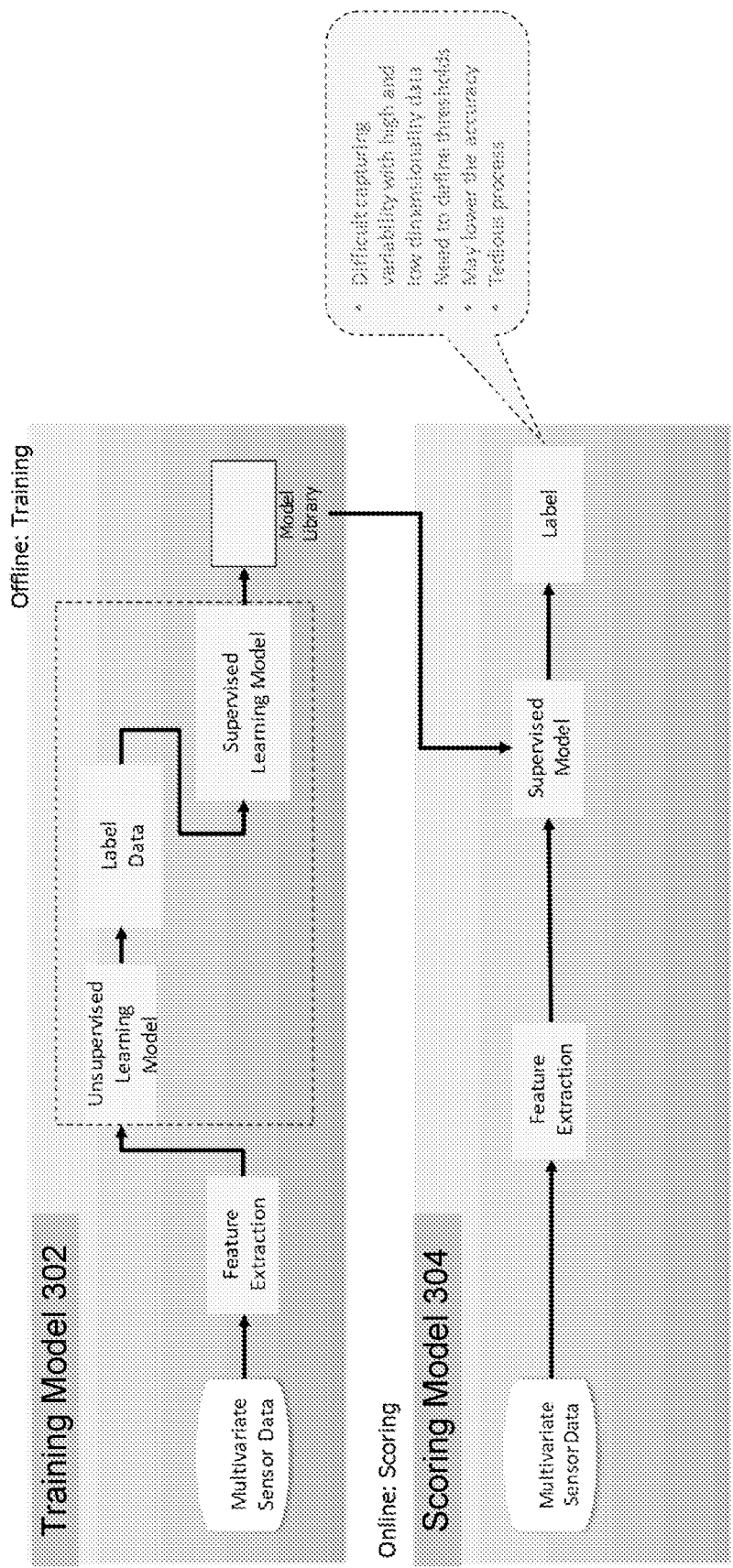
FIG. 3 depicts a training model and scoring model utilized in the prior art.

FIG. 3 depicts a training model 302 and scoring model 304 utilized in the prior art. In the example depicted in FIG. 3, historical sensor data may be received from any number of sensors associated with any number of components of an asset (e.g., wind turbines and solar panel generators). The historical sensor data may be multivariate sensor data. Multivariate sensor data is generated by a plurality of sensors received from one or more assets. There may be any number of sensors associated with any number of components. Once models are generated using the historical sensor data, current (new) multivariate sensor data generated by the sensors is received by the scoring model 304 which then utilizes the models from the training model 302 to label and identify existing or future failures.

Typically, the training model 302 receives the label information (often unreliable and incomplete) from any number of sources. The sources may include individuals who have manually created the label data from the historical sensor data or other historical sensor data. The training model 302 may receive historical data from any number of sensors of any number of electrical assets. The historical data may be multivariate, time series data.

The training model 302 may perform feature extraction and then generate supervised model(s) based on the labels and the features extracted from the historical data. Subsequently, the scoring model 304 may receive current multivariate sensor data from any number of sources, extract features from the data and apply a supervised model to the extracted features to identify applicable labels based on them model(s) from the training model 302.

Once the models are created using the unreliable labels and historical sensor data, the scoring model 304 may receive new (e.g., "current") sensor data from the same or similar sensors of assets. The scoring model 304 may extract features from the current sensor data in a manner similar to that of the training model 302. The scoring model 304 applies to the supervised model generated by the training model 302 to label a state (e.g., condition) of an asset, scenario, or asset as potentially in failure or may be in failure.

As discussed herein, in order for the scoring model 304 to identify failures or forecast failures, the scoring model 304 must rely on the models generated by the training model 302. However, the models generated by the training model 302 depend upon the unreliable label data and, as such, produces errors, affects failure detection, and leads to erroneous predictions.

In order to avoid creating manual labels that may be incomplete and/or erroneous, the training model 302 may utilize an unsupervised learning model to generate the label data from extracted features of the historical sensor data.

In this example, once the training model 302 extracts features, the training model may apply an unsupervised learning model to generate the label data. Unsupervised learning learns from the extracted features which had not been previously labeled, classified, or categorized. Unsupervised learning identifies commonalities in the data and may react to the presence or absence of such commonalities to generate labels. Unsupervised learning, however, tends to look at similarities (as defined by some metric) in the data to separate the data into groups. The definition and measure of similarities tends to group data unpredictably and in a manner that may not be explainable or accurate.

Once the models are created using the unsupervised learning model labels and historical sensor data, the scoring model 304 receives new (e.g., "current") sensor data from the same or similar sensors of assets. The scoring model 304 extracts features from the current sensor data and then applies the model generated by the training model 302 to label a state (e.g., condition) of an asset, scenario, or asset as potentially in failure or may be in failure.

In order for the scoring model 304 to identify failures or forecast failures, the scoring model 304 must rely on the models generated by the training model 302. However, because of the nature of unsupervised learning, the labels generated by the scoring model 304 have difficulty capturing low variability with high and low dimensionality data. Accuracy can suffer, and the process is tedious as well as computationally inefficient. Further, thresholds need to be defined to make conclusions based on the labels, however, this further lends to inaccurate fault detection and fault prediction (e.g., false positives or incorrect negatives).

Figure 4:
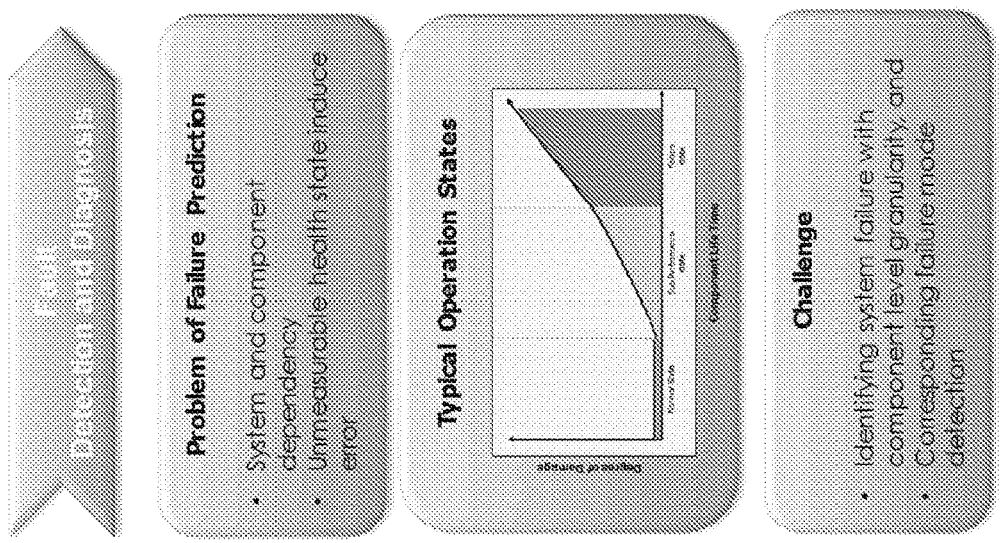
FIG. 4 depicts an example how faults may propagate through a system thereby making accurate failure detection and prediction difficult.
Figure 4:
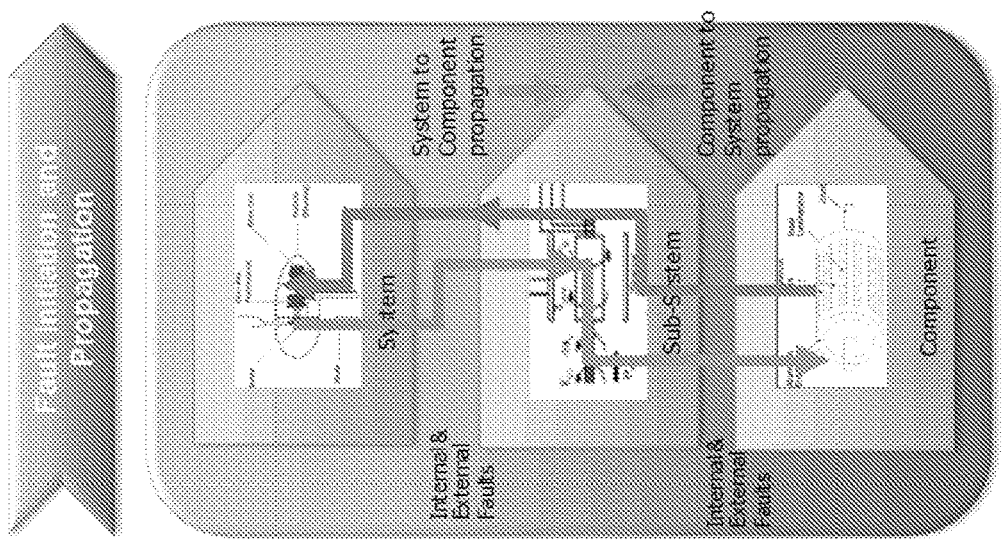
Figure 4:
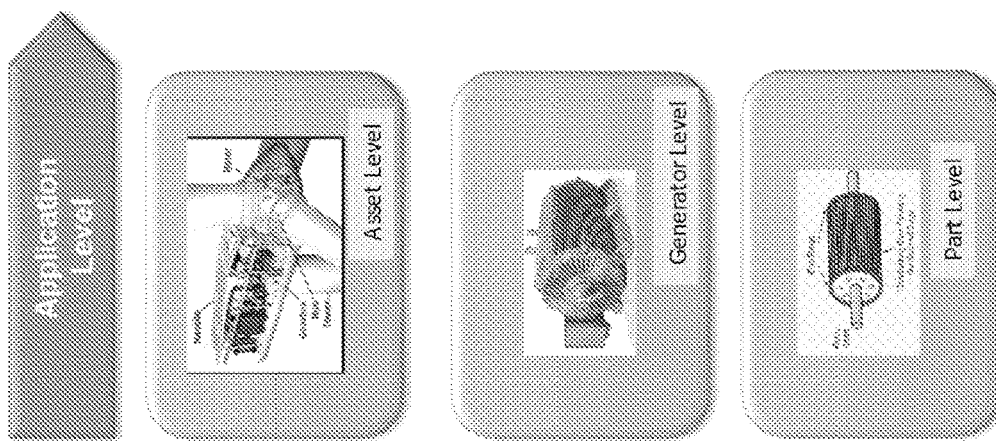

FIG. 4 depicts an example how faults may propagate through a system thereby making accurate failure detection and prediction difficult. In this example, an example wind turbine is used to show presence of hidden states (e.g., failure modes) within a system. In this example, the wind turbine is depicted as having an asset level (e.g., including a nacelle, rotor, gearbox, hub, and tower), generator level, and part level (e.g., including rotor shaft, end rings, and conducting bars forming a cage. The asset level may be considered a system, the generator level a sub system, and the part level a component system.

Faults at the system level (e.g., in the blades or rotor) may propagate (e.g., trigger) failures and/or behaviors within sub systems and similarly within components. Similarly, faults at the component level (e.g., regarding a specific gear) may propagate failures and/or behaviors within sub systems and similarly within the system. It will be appreciated that these failures propagate because of system and component dependency. As a result, signals from sensors at the component, sub-system, and system level may indicate anomalous behaviors and failures, thereby making determination of the failure difficult.

As discussed herein, failures in the main shaft bearing may lead to sensors of blades, rotors, and generators indicating rising temperature, noise, and vibration. As such, it may be difficult to identify the failure mode or the failure at the component level. As a result, there is an increasing challenge of identifying failures with component-level granularity. Similarly, there is an increasing challenge to detect failure modes.

Figure 5:
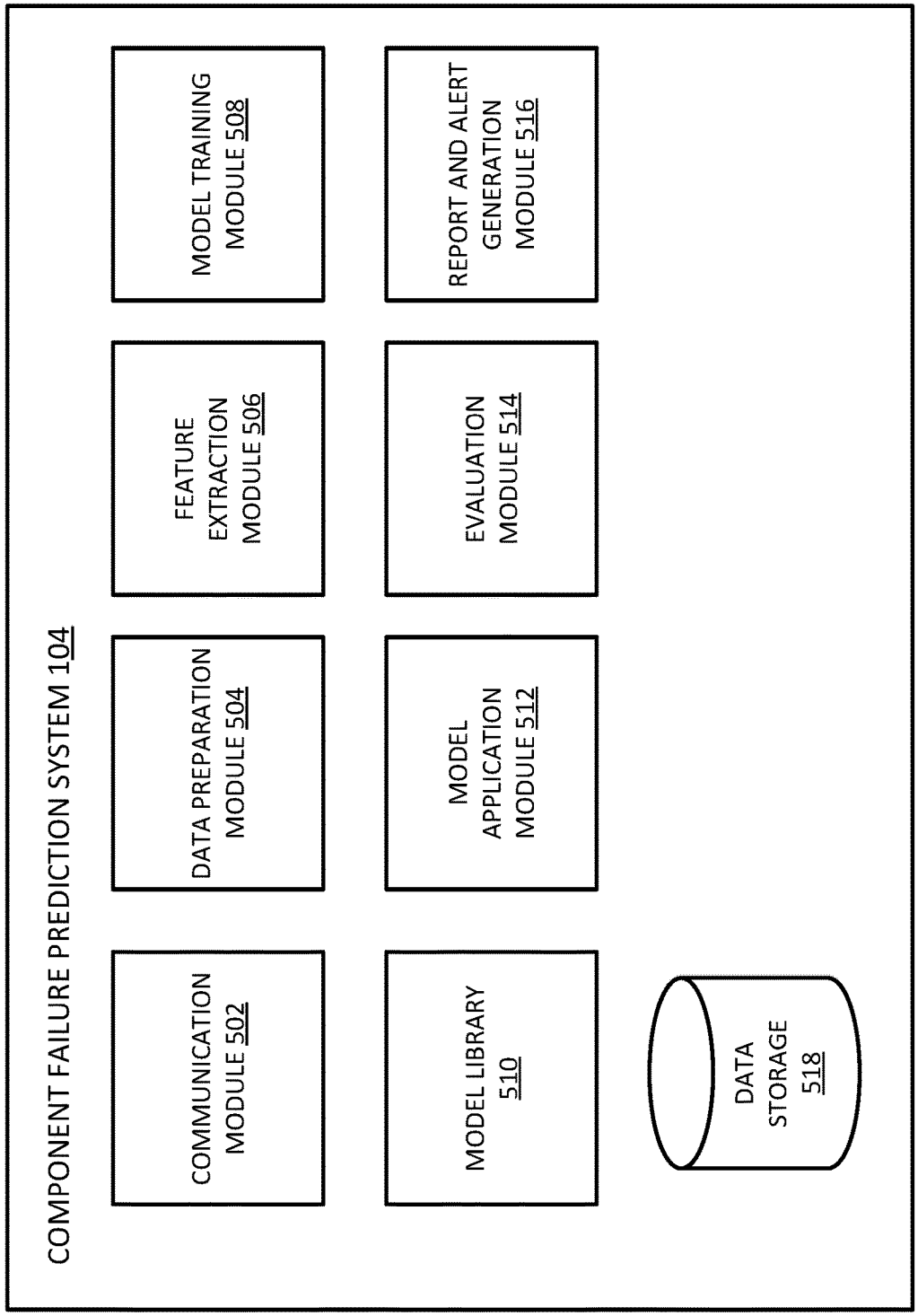
FIG. 5 depicts a component failure prediction system in some embodiments.

FIG. 5 depicts a component failure prediction system 104 in some embodiments. The component failure prediction system 104 comprises a communication module 502, a data preparation module 504, a feature extraction module 506, a model training module 508, a model library 510, a model application module 512, an evaluation module 514, report and alert generation module 516, and data storage 518.

Figure 6:
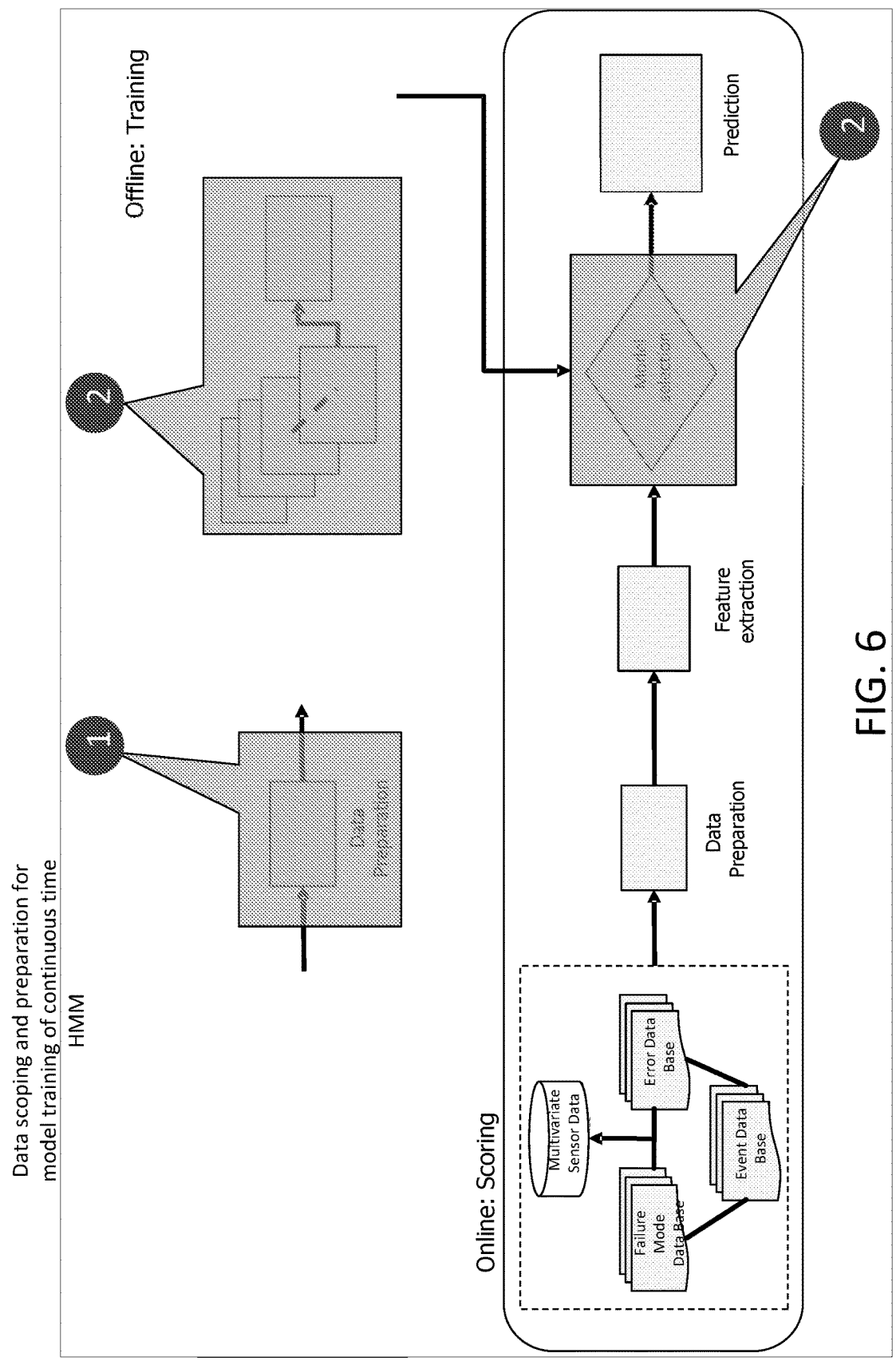
FIG. 6 depicts an example process of the component failure prediction system in some embodiments.

FIG. 6 depicts an example process of the component failure prediction system 104 in some embodiments. In some embodiments, the component failure prediction system 104 receives historical sensor data from any number of sensors of any number of electrical assets, prepares the data for analysis (e.g., normalizes, standardizes, structures, and the like), extracts features from the prepared data (and potentially reduces dimensionality of the features), trains any number of models using the prepared data, and stores the models in the model library. The component failure prediction system 104 may subsequently receive current (e.g., new) sensor data from at least a subset of the same sensors of any number of electrical assets, prepares the data for analysis (e.g., normalizes, standardizes, structures, and the like), extracts features from the prepared data (and potentially reduces dimensionality of the features), selects a model from the model library, applies the model to the extracted features, and generates a prediction.

The communication module 502 may be configured to transmit and receive data between two or more modules in component failure prediction system 104. In some embodiments, the communication module 502 is configured to receive information (e.g., historical sensor data and/or current sensor data) regarding assets of the electrical network 102 (e.g., from the power system 106, sensors within components of the electrical network 102 such as the renewable energy sources 112, third-party systems such as government entities, other utilities, and/or the like).

The communication module 502 may be configured to receive historical data regarding electrical assets either individually or in combination (e.g., wind turbines, solar panels, windfarms, solar farms, components of devices, components of wind turbines, components of solar panels, substations 114, transformers 116, and/or transmission lines 110). The communication module 402 may further receive sensor data from one or more sensors of any number of electrical assets such as those described above.

The data preparation module 504 may prepares for building an appropriate data scoping process that can aid a state-based machine learning model to explicitly model the dependency that exists between a system (e.g., wind turbine) and its components. Subsequently, the data preparation module 504 may scope the data to retrieve or identify sequences within the historical sensor data. In some embodiments, the data preparation module 504 performs data preparation for model training of continuous time hidden Markov model (HMM) analysis.

In various embodiments, the data preparation module 504 performs several steps of data querying activity before the final set of training data is ready. The data preparation module 504 may call a set of instructions that can query a predefined library (e.g., from the data storage 518) or search space that include keywords that can automatically identify failure modes for a given component name.

Further, the data preparation module 504 may identify a list of failure times and/or dates pertaining to the identified failure mode from an appropriate database.

Next, the data preparation module 504 may perform sub-sequencing which performs the task of sequential pattern mining of the given data. Further, the data preparation module 504 may utilize the extracted failure date and query different log files and/or data base(s) (e.g., different data sources and different information within different data sources) for identifying the supporting data set that can map the historic component failure to the historic system and component related errors and/or events. This step of data scoping along with the extracted features may define the system to component and component to component relationship in the training data set.

Figure 8:
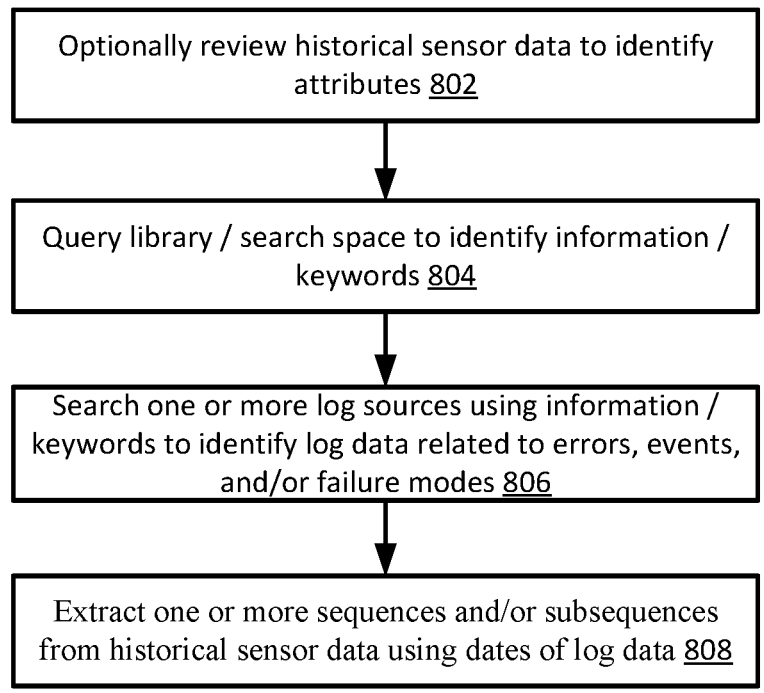
FIG. 8 is a flowchart for data scoping and data preparation in some embodiments.

The process is further described with respect to FIG. 8.

The feature extraction module 506 may extract features (e.g., dimensions and/or variables) from the received historical sensor data. The multivariate sensor data may, as discussed herein, be time series data. For example, the feature extraction module 506 may extract features from the time series data.

Either before or after features or extracted, the feature extraction module 506 may create new features from an initial set of data. These features may encapsulate central properties of a data set and represent the data set and a low dimensional space that facilitates learning. As can be appreciated, the initial multivariate sensor data may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data.

In some embodiments, the feature extraction module 506 may utilize dimensionality reduction to map timeseries data to a lower dimensional space. Time series data may be decomposed into components that represent one or more patterns. The components, or the parameters associated with the patterns, represent features of a time series that can be used in models. For example, time series data may be clustered into common patterns. Trend and classical decomposition may utilize a series of moving averages to decompose time series data to extract features.

It will be appreciated that any form of decomposition and/or feature extraction may be utilized. For example, instead of trend decomposition, singular spectrum analysis that applies an adaptation of principal component analysis (PCA) may be utilized to decompose time series data. Principal components may then be utilized to forecast and model each separately and, in some embodiments, aggregate the component series forecasts to forecast the original series.

It will be appreciated that, in some embodiments, features are not extracted but rather the sequence data that is retrieved is used to train one or more models.

The model training module 508 may train one or more models. In various embodiments, extractions from sequences containing observations of normal data may be retrieved, sequences containing error data may be retrieved, and sequences containing observations may be retrieved. Utilizing these extracted retrieved sequences, hidden markov models (HMMs) may be trained. An HMM is a statistical Markov model in which the system being modeled has a Markov process with one or more unobserved states. A hidden Markov model may be a Markov chain for which the state is only partially observable. In other words, observations are related to the state of the system, but they are typically insufficient to precisely determine the state.

In various embodiments, the model training module 508 utilizes the extractions of sequences as observed data as well as a number of states to estimate HMM model parameters. States may be determined based on the electrical asset(s) providing all or some of the historical sensor data, from the historical sensor data itself, and/or provided by one or more entities (e.g., operator, service provider, manufacturer, utility, and/or the like).

The model library 510 and/or the data storage 518 may store the models generated by the model training module 508. The model library 510 may enable logical retrieval of one or more models based on current (e.g., new) sensor data for fault prediction.

The model application module 512 may apply the model(s) generated by the model training module 508 to new sensor data (e.g., current sensor data). For example, once the model(s) are generated, the component failure prediction system 104 may receive current (e.g., new) data from any number of sensors (e.g., the same sensors that provided the historical sensor data and/or other sensors) to detect and/or predict failures.

The evaluation module 514 may be configured to evaluate the results from the model application module 512. In various embodiments, the results from the application of the model(s), the evaluation module 514 may apply thresholds or triggers to identify failures or predictions of failures (e.g., significant failures or failures of with sufficient confidence).

The report and alert generation module 516 may generate a report including the results of the application of the model(s) to identify components and/or assets that are expected to suffer a failure (and/or are suffering a failure). In various embodiments, the report may indicate a timeframe after or at which the failure is expected to occur. The report and alert generation module 516 may provide the report to the operator, utility, maintenance service devices, and/or the like.

In various embodiments, the report and alert generation module 516 may generate an alert based on the results of the application of the model(s). For example, the report and alert generation module 516 may provide alert communications (e.g., email, SMS text, phone calls, and/or the like) to devices to indicate a significant failure prediction or current failure. The report and alert generation module 516 may compare the results from the application of the model(s) to any number of criteria to determine significance. The criteria may include, but not be limited to, a number of failures in close proximity to each other, a number of failures, significance of one or more failures (e.g., risking an asset as a whole, impacting other assets, or impacting the electrical network), and/or the impact the failure may have to critical or important services.

The data storage 518 may include any number of data storage devices and or logical storage spaces. The data storage 518 may include, for example, any number of databases, tables, and/or any other data structures. The data storage 518 may be configured to store any amount of historical sensor data, current sensor data, extracted features, generated models, labels, results of application of models to current sensor data, reports, and/or alerts.

Figure 7:
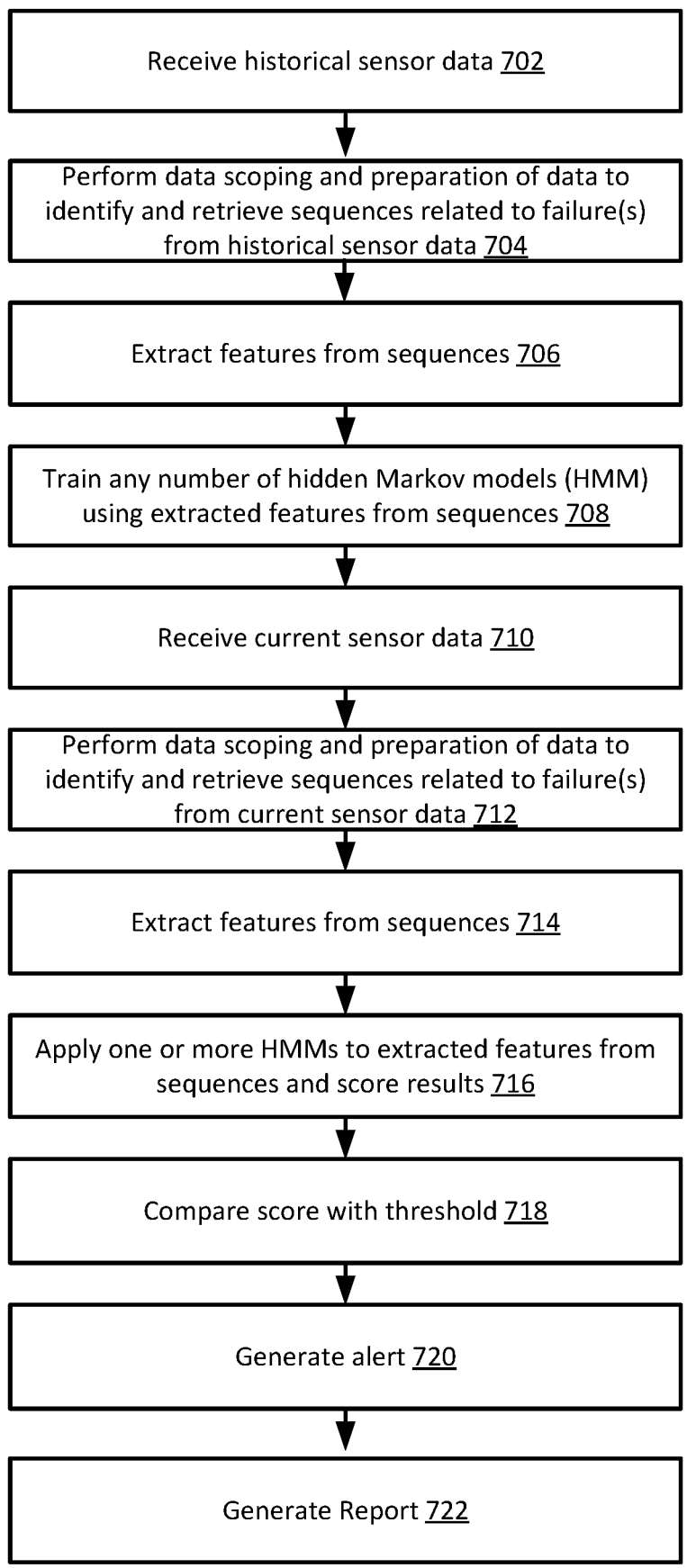
FIG. 7 is a flowchart of an example process for predicting faults using data scoping in some embodiments.

FIG. 7 is a flowchart of an example process for predicting faults using data scoping in some embodiments. In step 702, the communication module 502 receives historical sensor data regarding electrical assets either individually or in combination (e.g., wind turbines, solar panels, windfarms, solar farms, components of devices, components of wind turbines, components of solar panels, substations 114, transformers 116, and/or transmission lines 110). The communication module 502 may receive sensor data from one or more sensors of any number of electrical assets. In various embodiments, the communication module 502 receives and/or retrieves the historical sensor data from any number of sources.

Similarly, in various embodiments, the communication module 502 retrieves or receives log data from any number of log sources. Examples of log sources include, but are not limited to, a failure mode database, an error database, and an event database. The failure mode database, air database, an event databases may each be databases that contain log files that stores the relevant data.

The failure mode database may contain log data related to different modes of failure of components, subsystems, and/or systems of electrical assets. The log data may be generated and/or stored by any number of sources including an operator, administrator, support service systems, and/or the like. In various embodiments, software (e.g., within or in communication with an electrical asset) may detect failures in detect different modes of failure. As a result, the software may store data related to those modes of failure within the failure mode database.

The error database may contain log data related to different data errors such as errors identified in or by sensor signals. Similarly, the error database may contain data that identifies errors previously identified by operational software, operating system software, analysis software, or the like. The errors in the log data may indicate errors of components, subsystems, or systems. Similarly, peers may indicate errors identified by signals from one or more sensors of an electrical asset.

The event database may contain log data related to different events associated with components, subsystems, and/or systems of electrical assets. In some embodiments, the log data contained within the event database may also be associated with weather events, network failures, demand, installation of new equipment, and/or the like.

In step 704, the data preparation module 504 performs data scoping and preparation for building an appropriate data scoping process that can aid a state-based machine learning model to explicitly model the dependency that exists between a system (e.g., wind turbine) and its components. FIG. 8 further describes the data scoping and preparation process.

In step 706, the feature extraction module may extract features (e.g., dimensions and/or columns) from any number of sequences from the data preparation module 504.

In step 708, the model training module 508 may train one or more models. The model training module 508 estimates HMM model parameters using extractions of sequences as observed data as well as a number of states to estimate HMM model parameters. States may be determined based on the electrical asset(s) providing all or some of the historical sensor data, from the historical sensor data itself, and/or provided by one or more entities (e.g., operator, service provider, manufacturer, utility, and/or the like).

In some embodiments, the model training module 508 may receive a listing of predefined fault states of different components. Any number of these different possible fault states may be hidden and only observable from the sensor data (e.g., the extracted sequences of sensor data). The model training module 508 may utilize the extracted sequences of sensor data to determine the probability of the existence of each hidden state. Similarly, the model training module 508 may utilize the extracted sequences of sensor data to determine the probability of a at least a subset of hidden states (e.g., b1(O)-bN(O)) to transition between each of the other hidden states (probabilities a11, a12, a21, . . . aN1, aN−1*N) or stay in its current state (probabilities a11 . . . aNN).

In various embodiments, the model training module 508 determines probability using an iterative Expectation-Maximization (EM) algorithm (e.g., Baum-Welch algorithm). It will be appreciated that the model training module 508 may utilize different and/or combinations of algorithms. For example, given a sequence of observations, a Viterbi algorithm may compute the most-likely corresponding sequence of states, a forward algorithm will compute the probability of the sequence of observations, and the Baum-Welch algorithm will estimate the starting probabilities, the transition function, and the observation function of a hidden Markov model. In some embodiments, the Baldi-Chauvin algorithm is used in place of the Baum-Welch algorithm. The forward-backward algorithm an inference algorithm for HMM models and may compute posteriormarginals of hidden state variables given a sequence of observations. The Baum-Welch algorithm may find the maximum likelihood estimate of the parameters of a hidden Markov model given a set of observed feature vectors (e.g., features of the extracted sequences). The forward-backward algorithm may calculate the likelihood of new data in a certain state.

Figure 12:
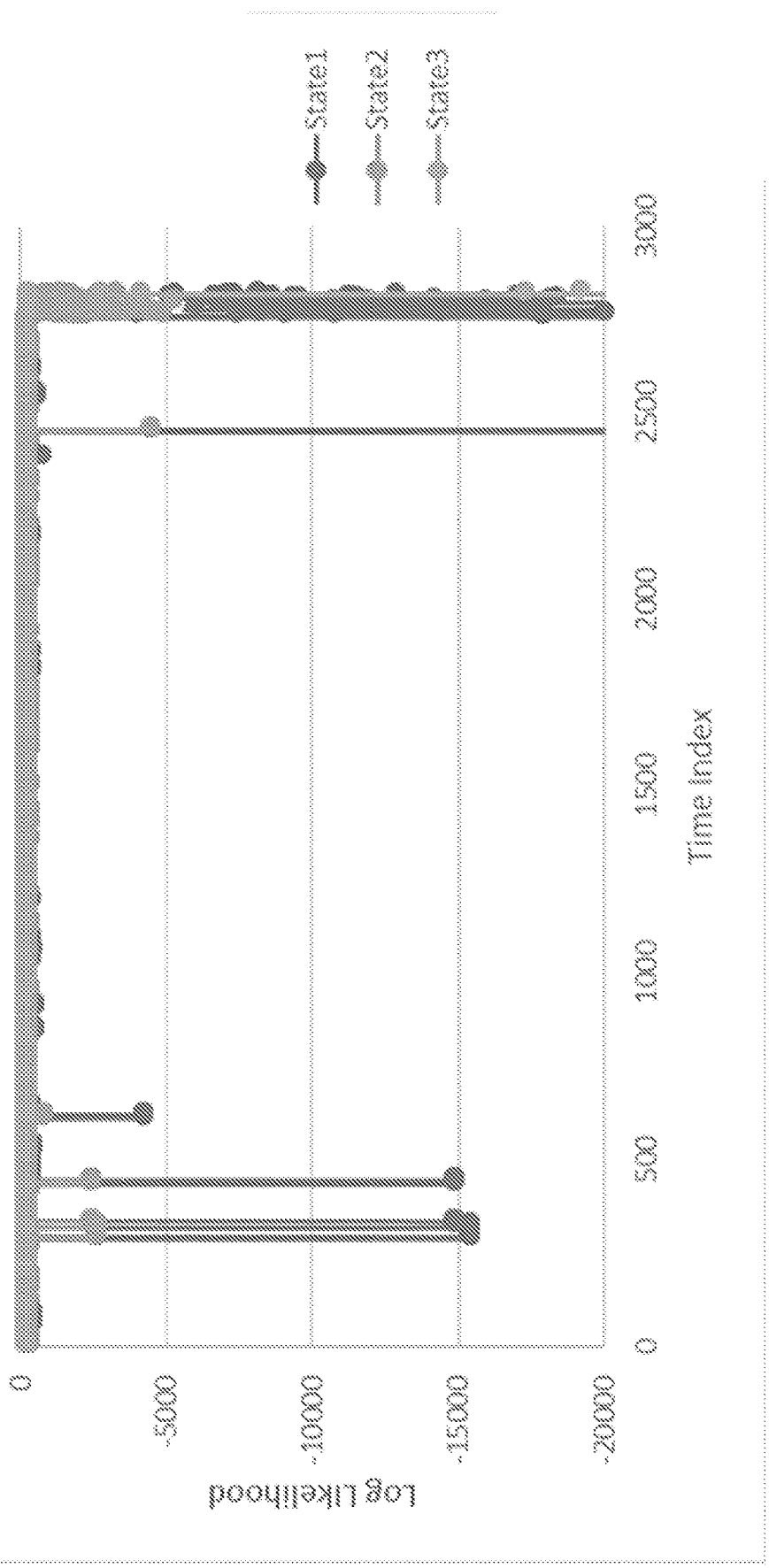
FIG. 12 depicts an example report for fault and prediction analysis indicating loglikelihood of failure for different states of a Turbine in some embodiments.

The model training module 508 trains the HMM models for each health state. FIG. 12 depicts a diagram for system level training and scoring of health status in some embodiments. For each of a set of components of any number of electrical assets, different fault states are assessed and modes identified (e.g., based on a statistical model such as Log-likelihood) for each fault. The different fault states may be known and/or determined from the historical sensor data (e.g., from extractions of the sequences of the historical sensor data). As shown in FIG. 12, there may be any number of faults, any number of modes associated with that fault, and any number of components.

In some embodiments, the framework in FIG. 12 provides a platform to train the preprocessed historic data for every system and its corresponding subsystem. Also, the framework is conducive to train the machine learning model on various faults and its corresponding failure modes.

In step 710, the communication module 502 receives the current sensor data from any number of the sensors of any number of electrical assets. in various embodiments, the current sensor data is from the same or a subset of the sensors that provided the historical sensor data.

In step 712, the data preparation module 504 performs data scoping and preparation using the data from the current sensor data. In various embodiments, the data preparation module 504 may utilize the same information and/or keywords used in assessing the historical sensor data to retrieve data from any number of log sources (e.g., the same log sources, or a subset of sources, used by the data preparation module 504 with regard to the historical sensor data). The data preparation module 504 may retrieve dates and/or times that may be used to extract sequences from the current sensor data. The process may be similar to that as discussed in step 704.

In step 714, the feature extraction module may extract features (e.g., dimensions and/or columns) from any number of sequences of the current sensor data from the data preparation module 504.

In step 716, the model application module 512 may apply any number of the HMM models from the model library and/or the data storage 518 to the sequences of the current sensor data (or extracted features of the sequences of the current sensor data).

The model application module 512 may score using the most likely model parameters and the newly observed data to calculate the likelihood of new data in the certain state. This may be solved using a forward-backward algorithm.

Figure 11:
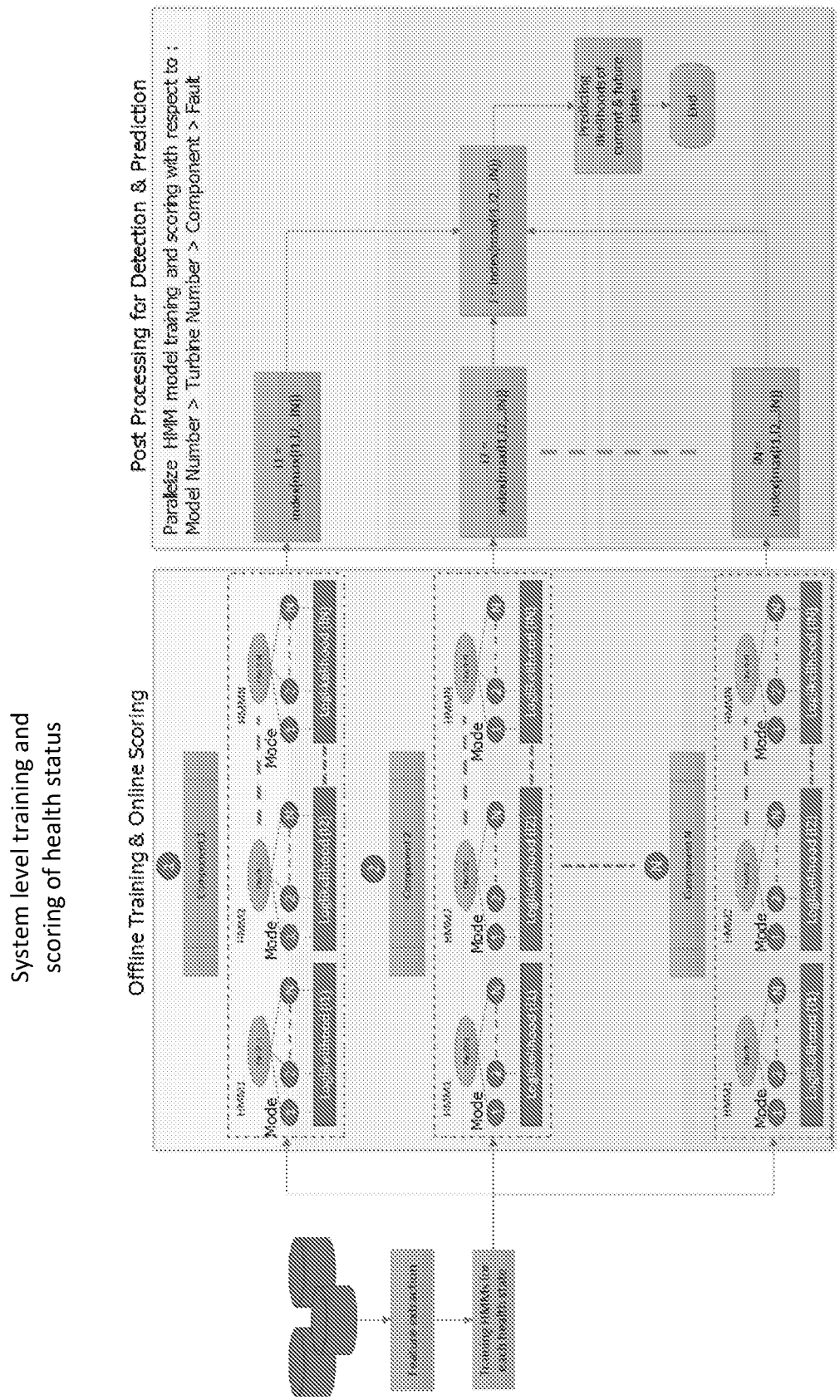
FIG. 11 depicts system level training and scoring of health status of components and systems of an electrical network in some embodiments.

FIG. 11 depicts system level training and scoring of health status of components and systems of an electrical network in some embodiments. In various embodiments, as depicted in FIG. 11, during online model scoring, the model application module 512 collect the likelihood values and arrive at a consensus using the defined consensus mechanism (e.g., comparing maximum loglikelihood of failure of different components). This method of training and scoring helps to evaluate the occurrence of different failure modes for every subsystem at a given point of time thereby increasing accuracy, predictability, and prediction time.

Figure 10:
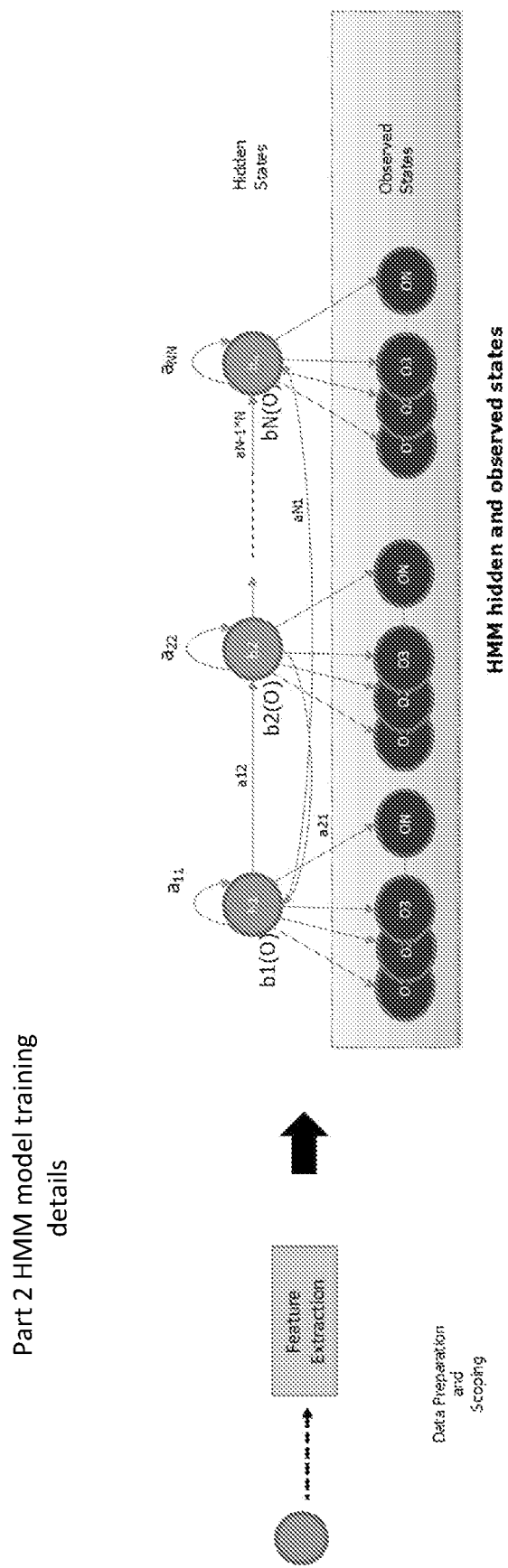
FIG. 10 depicts an example report for fault and prediction analysis for an electrical asset using information fusion.

It will be appreciated that the model application module 512 may predict likelihood of current state but also future states using the probabilities determined between shifting between states as shown in FIG. 10. The prediction of likelihood may be, in some embodiments, a score.

In step 718, the evaluation module 514 compares scores (e.g., predictions of likelihood) to predetermined thresholds. It will be appreciated that each score for each failure of a component or subsystem may be associated with different thresholds. Some faults may, for example, be more serious to system health than others and, as such, a more stringent threshold may be required when compared to the likelihood that the fault exists or will exist.

In step 720, the report and alert generation module 516 generates an alert based on the comparison of the prediction of likelihood and/or score to the threshold(s). in some embodiments, the report and alert generation module 516 may not generate an alert if the likelihood and/or prediction of a fault is low or otherwise indicates that any number of components, systems, subsystems, and/or the like are operating within acceptable parameters.

In step 722, the report and alert generation module 516 may generate a report as discussed herein.

Figure 9:
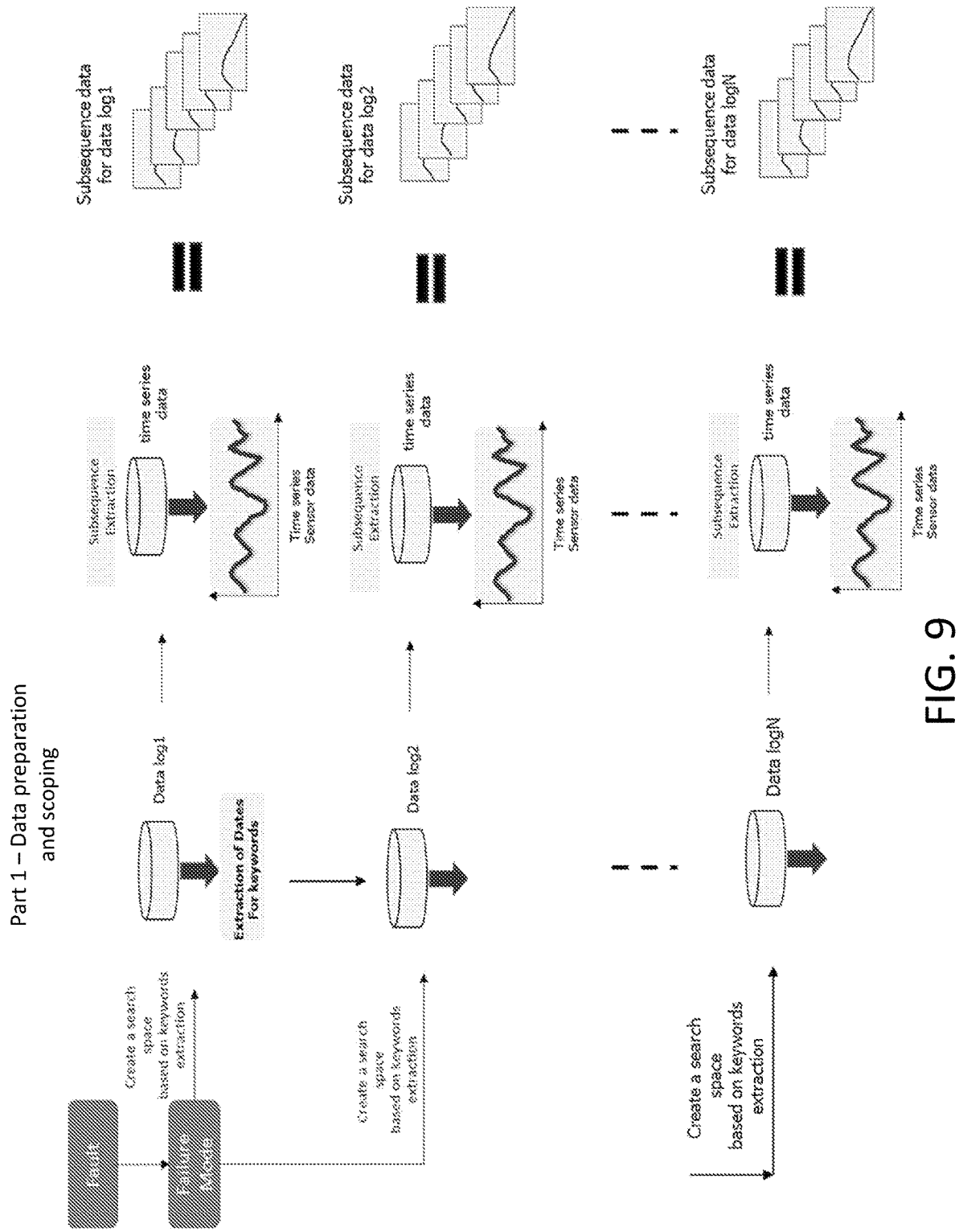
FIG. 9 is a diagram depicting an example process for data scoping and data preparation in some embodiments

FIG. 8 is a flowchart for data scoping and data preparation in some embodiments. FIG. 9 is a diagram depicting an example process for data scoping and data preparation in some embodiments. In step 802, the data preparation module 504 may optionally review all or part of the historical sensor data and identify attributes within the historical sensor data that may suggest a failure condition. The attributes may include errors, erroneous values, indications of failures or the like. For example, the historical sensor data may contain sensor data that exceed or fall below one or more normal operating thresholds of the type of sensor that generated that data. The data preparation module 504 may subsequently utilize all or part of the sensor data to identify keywords or conditions to perform additional queries.

In step 804, the data preparation module 504 calls a set of instructions to query a predefined library or search space to identify information and/or keywords. In various embodiments, the information and/or keywords can be used in conjunction with one or more log sources (e.g., query the log data in log source(s)) to identify events, errors, and/or one or more failure modes. In some embodiments, the data preparation module 504 generates different queries based on information from the historical sensor data (e.g., as that performed in optional step 802). Alternately, the data preparation module 504 may identify one or more queries to perform based on the type of electrical asset that generated the historical sensor data, the type of component or subsystem of that electrical asset that generated the historical sensor data, the system that provided all or some of the historical sensor data, and/or the like.

In step 806, the data preparation module 504 utilizes the information and/or keywords to search any number of log sources (e.g., error logs, failure logs, and event logs) to identify dates associated with one or more failures. In various embodiments, the data preparation module 504 identifies one or more times and/or dates of log data related to errors, failures, and events that were stored in the log source(s).

In step 808, the data preparation module 504 extracts one or more sequences and/or subsequences of historical sensor data using the dates and/or times identified from the log sources. The sequences and/or subsequences identify time series sensor data. In some embodiments, this process enables pattern data mining to identify failures within the given data. In this example, the data preparation module 504 utilizes the extracted failure date and query different log files and/or data base(s) (e.g., different data sources and different information within different data sources) for identifying the supporting data set that can map the historic component failure to the historic system and component related errors and/or events.

In various embodiments, the data preparation module 504 utilizes different information and/or keywords for different log sources, extracts dates/times for each of the log sources, and extracts different subsequences of the historical sensor data using the different extracted dates/times to create different data subsequences for training models.

It will be appreciated that subsequence extractions as discussed herein may be pattern extractions. By retrieving data includes dates and/or times from the log sources, different information (e.g., sequences) may be retrieved from the historical sensor data. For example, sequences containing observations of normal data may be retrieved, sequences containing error data may be retrieved, and sequences containing observations may be retrieved.

Utilizing these retrieved sequences, hidden Markov models (HMMs) may be trained. An HMM model is a statistical Markov model in which the system being modeled has a Markov process with one or more unobserved states. A hidden Markov model may be a Markov chain for which the state is only partially observable. In other words, observations are related to the state of the system, but they are typically insufficient to precisely determine the state.

In various embodiments, the training of the HMM models is performed offline for computational efficiency and scaling of the training system. Any number of digital devices may perform the model training.

FIG. 12 depicts an example report for fault and prediction analysis indicating loglikelihood of failure for different states of a Turbine in some embodiments. In this example, state 1 has a loglikelihood prediction of −15,000 for time 250-500 and a loglikelihood of more than −5,000 at about time 520. The loglikelihood of state 1 appears beyond −20,000 at around time 2,500 and again repeatedly high (e.g., between −5,000 and −20,000) between times 2,500 and 3,000.

State 2 has a loglikelihood prediction of about −240 for time 250-500 and a loglikelihood of more than about −100 at time 520. The loglikelihood of state 2 appears around −4,500 at around time 2,500 and again repeatedly high (e.g., between 0 and −5000) between times 2,500 and 3,000.

State 1 has a loglikelihood prediction of around 0 until between times 2,500 and 3,000 when the loglikelihood prediction of state 1 ranges from about −1,500 to −4,000 and between −15,000 and −20,000.

Figure 13:
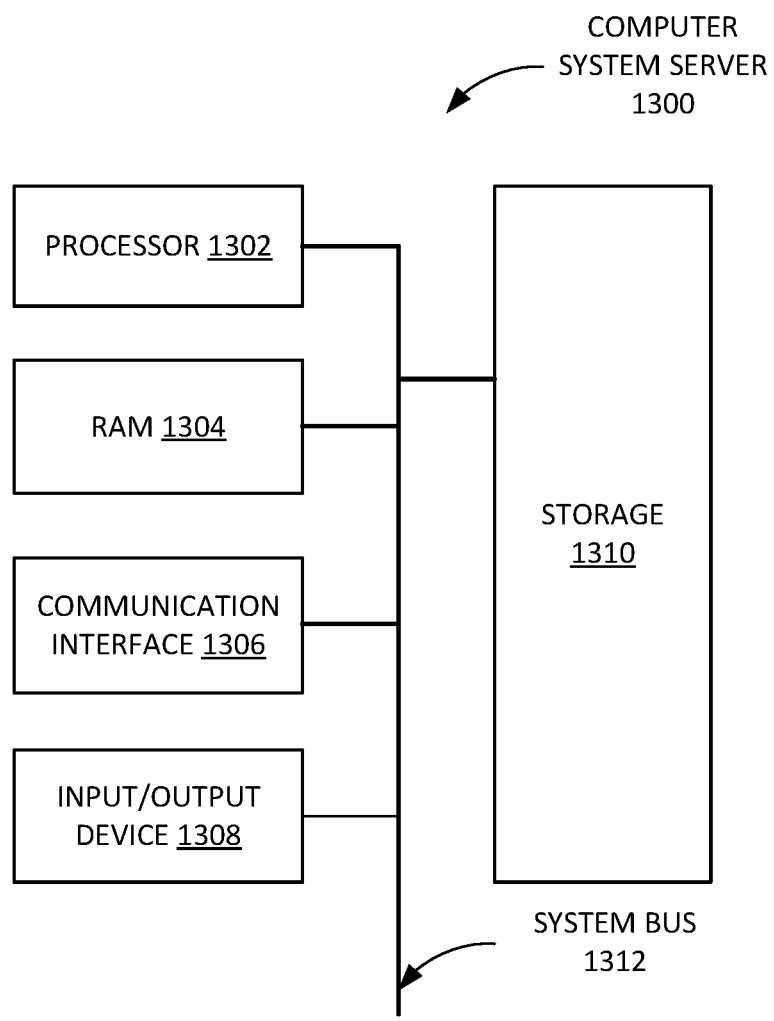
FIG. 13 depicts a block diagram of an example computer system according to some embodiments.

FIG. 13 depicts a block diagram of an example computer system 1300 according to some embodiments. Computer system 1300 is shown in the form of a general-purpose computing device. Computer system 1300 includes processor 1302, RAM 1304, communication interface 1306, input/output device 1308, storage 1310, and a system bus 1312 that couples various system components including storage 1310 to processor 1302.

System bus 1312 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1300 typically includes a variety of computer system readable media. Such media may be any available media that is accessible by the computer system 1300 and it includes both volatile and nonvolatile media, removable and non-removable media.

In some embodiments, processor 1302 is configured to execute executable instructions (e.g., programs). In some embodiments, the processor 1004 comprises circuitry or any processor capable of processing the executable instructions.

In some embodiments, RAM 1304 stores data. In various embodiments, working data is stored within RAM 1304. The data within RAM 1304 may be cleared or ultimately transferred to storage 1310.

In some embodiments, communication interface 1306 is coupled to a network via communication interface 1306. Such communication can occur via Input/Output (I/O) device 1308. Still yet, the computer system 1300 may communicate with one or more networks such as a local area network (LAN), a general wide area network (WAN), and/or a public network (e.g., the Internet).

In some embodiments, input/output device 1308 is any device that inputs data (e.g., mouse, keyboard, stylus) or outputs data (e.g., speaker, display, virtual reality headset).

In some embodiments, storage 1310 can include computer system readable media in the form of volatile memory, such as read only memory (ROM) and/or cache memory. Storage 1310 may further include other removable/non-removable, volatile/non-volatile computer system storage media. By way of example only, storage 1310 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1312 by one or more data media interfaces. As will be further depicted and described below, storage 1310 may include at least one program product having a set (e.g., at least one) of program modules that are configured to carry out the functions of embodiments of the invention. In some embodiments, RAM 1304 is found within storage 1310.

Program/utility, having a set (at least one) of program modules, such as those contained within the component failure prediction system 104, may be stored in storage 1310 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein. A module may be hardware (e.g., ASIC, circuitry, and/or the like), software, or a combination of both.

It should be understood that although not shown, other hardware and/or software components could be used in conjunction with the computer system 1300. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer-readable medium comprising executable instructions, the executable instructions being executable by one or more processors to perform a method, the method comprising:
receiving first sensor data of a first time period, the first sensor data from one or more first sensors of a renewable energy asset;
identifying first log data in one or more log sources, the first log data indicating one or more first faults in the renewable energy asset, the one or more log sources storing log data of the renewable energy asset;
retrieving first dates of the first log data that indicates the one or more first faults;
retrieving first sequences of the first sensor data using the first dates of the first log data;
applying one or more trained hidden Markov models to the first sequences of the first sensor data to assess one or more likelihoods of the one or more first faults and create a prediction of a future fault in the renewable energy asset, the one or more trained hidden Markov models trained on second sequences of second sensor data of a second time period, the second sensor data from one or more second sensors of the renewable energy asset;
generating a report including the prediction of the future fault in the renewable energy asset; and
controlling the renewable energy asset based on the prediction of the future fault in the renewable energy asset.

2. The non-transitory computer-readable medium of claim 1 wherein applying the one or more trained hidden Markov models to the first sequences of the first sensor data to assess the one or more likelihoods of the one or more first faults and create the prediction of the future fault in the renewable energy asset includes comparing one or more maximum loglikelihoods of one or more different failure states from one or more different components of the renewable energy asset.

3. The non-transitory computer-readable medium of claim 1 wherein applying the one or more trained hidden Markov models to the first sequences of the first sensor data to assess the one or more likelihoods of the one or more first faults and create the prediction of the future fault in the renewable energy asset includes determining probability of one or more different faults of two or more different components of the renewable energy asset using an iterative Expectation-Maximization (EM) algorithm.

4. The non-transitory computer-readable medium of claim 1, the method further comprising:
comparing the future fault against one or more criteria to determine a significance of the future fault;
generating an alert based on the significance, the alert identifying the future fault; and
providing the alert.

5. The non-transitory computer-readable medium of claim 1, the method further comprising:
receiving the second sensor data;
identifying second log data in the one or more log sources, the second log data indicating one or more second faults in the renewable energy asset;
retrieving second dates of the second log data that indicates the one or more second faults;
retrieving the second sequences of the second sensor data using the second dates of the second log data; and
training one or more hidden Markov models using the second sequences of the second sensor data to obtain the one or more trained hidden Markov models.

6. The non-transitory computer-readable medium of claim 5, the method further comprising extracting features from the second sequences of the second sensor data, and wherein training the one or more hidden Markov models using the second sequences of the second sensor data to obtain the one or more trained hidden Markov models includes training the one or more hidden Markov models using the features extracted from the second sequences of the second sensor data to obtain the one or more trained hidden Markov models.

7. The non-transitory computer-readable medium of claim 6 wherein extracting the features from the second sequences of the second sensor data includes dimension reduction of the second sequences of the second sensor data.

8. The non-transitory computer-readable medium of claim 1, the method further comprising extracting features from the first sequences of the first sensor data, and wherein applying the one or more trained hidden Markov models to the first sequences of the first sensor data to assess the one or more likelihoods of the one or more first faults and create the prediction of the future fault in the renewable energy asset includes applying the one or more trained hidden Markov models to the features extracted from the first sequences of the first sensor data to assess the one or more likelihoods of the one or more first faults and create the prediction of the future fault in the renewable energy asset.

9. The non-transitory computer-readable medium of claim 1 wherein the one or more first sensors are a subset of the one or more second sensors.

10. The non-transitory computer-readable medium of claim 1 wherein the first time period is a current time period and the second time period is a historical time period.

11. A system comprising:
at least one processor; and
memory containing executable instructions, the executable instructions being executable by the at least one processor to:
receive first sensor data of a first time period, the first sensor data from one or more first sensors of a renewable energy asset;
identify first log data in one or more log sources, the first log data indicating one or more first faults in the renewable energy asset, the one or more log sources storing log data of the renewable energy asset;
retrieve first dates of the first log data that indicates the one or more first faults;
retrieve first sequences of the first sensor data using the first dates of the first log data;
apply one or more trained hidden Markov models to the first sequences of the first sensor data to assess one or more likelihoods of the one or more first faults and create a prediction of a future fault in the renewable energy asset, the one or more trained hidden Markov models trained on second sequences of second sensor data of a second time period, the second sensor data from one or more second sensors of the renewable energy asset;
generate a report including the prediction of the future fault in the renewable energy asset; and
control the renewable energy asset based on the prediction of the future fault in the renewable energy asset.

12. The system of claim 11 wherein the executable instructions being executable by the at least one processor to apply the one or more trained hidden Markov models to the first sequences of the first sensor data to assess the one or more likelihoods of the one or more first faults and create the prediction of the future fault in the renewable energy asset includes executable instructions being executable by the at least one processor to compare one or more maximum loglikelihoods of one or more different failure states from one or more different components of the renewable energy asset.

13. The system of claim 11 wherein the executable instructions being executable by the at least one processor to apply the one or more trained hidden Markov models to the first sequences of the first sensor data to assess the one or more likelihoods of the one or more first faults and create the prediction of the future fault in the renewable energy asset includes executable instructions being executable by the at least one processor to determine probability of one or more different faults of two or more different components of the renewable energy asset using an iterative Expectation-Maximization (EM) algorithm.

14. The system of claim 11 wherein the executable instructions are further executable by the at least one processor to:
   compare the future fault against one or more criteria to determine a significance of the future fault;
   generate an alert based on the significance, the alert identifying the future fault; and
   provide the alert.

15. The system of claim 11 wherein the executable instructions are further executable by the at least one processor to:
   receive the second sensor data;
   identify second log data in the one or more log sources, the second log data indicating one or more second faults in the renewable energy asset;
   retrieve second dates of the second log data that indicates the one or more second faults;
   retrieve the second sequences of the second sensor data using the second dates of the second log data; and
   train one or more hidden Markov models using the second sequences of the second sensor data to obtain the one or more trained hidden Markov models.

16. The system of claim 15 wherein the executable instructions are further executable by the at least one processor to extract features from the second sequences of the second sensor data, and wherein the executable instructions being executable by the at least one processor to train the one or more hidden Markov models using the second sequences of the second sensor data to obtain the one or more trained hidden Markov models includes executable instructions being executable by the at least one processor to train the one or more hidden Markov models using the features extracted from the second sequences of the second sensor data to obtain the one or more trained hidden Markov models.

17. The system of claim 16 wherein the executable instructions to extract the features from the second sequences of the second sensor data includes executable instructions for dimension reduction of the second sequences of the second sensor data.

18. The system of claim 11 wherein the executable instructions are further executable by the at least one processor to extract features from the first sequences of the first sensor data, and wherein the executable instructions being executable by the at least one processor to apply the one or more trained hidden Markov models to the first sequences of the first sensor data to assess the one or more likelihoods of the one or more first faults and create the prediction of the future fault in the renewable energy asset includes executable instructions being executable by the at least one processor to apply the one or more trained hidden Markov models to the features extracted from the first sequences of the first sensor data to assess the one or more likelihoods of the one or more first faults and create the prediction of the future fault in the renewable energy asset.

19. The system of claim 11 wherein the one or more first sensors are a subset of the one or more second sensors.

20. A method comprising:
   receiving first sensor data of a first time period, the first sensor data from one or more first sensors of a renewable energy asset;
   identifying first log data in one or more log sources, the first log data indicating one or more first faults in the renewable energy asset, the one or more log sources storing log data of the renewable energy asset;
   retrieving first dates of the first log data that indicates the one or more first faults;
   retrieving first sequences of the first sensor data using the first dates of the first log data;
   applying one or more trained hidden Markov models to the first sequences of the first sensor data to assess one or more likelihoods of the one or more first faults and create a prediction of a future fault in the renewable energy asset, the one or more trained hidden Markov models trained on second sequences of second sensor data of a second time period, the second sensor data from one or more second sensors of the renewable energy asset;
   generating a report including the prediction of the future fault in the renewable energy asset; and
   controlling the renewable energy asset based on the prediction of the future fault in the renewable energy asset.

* * * * *